United States Patent [19]

Peterman

[11] Patent Number: 5,298,159
[45] Date of Patent: Mar. 29, 1994

[54] FILTER-COLLECTOR APPARATUS

[75] Inventor: William R. Peterman, Muncy, Pa.

[73] Assignee: The Young Industries, Inc., Muncy, Pa.

[21] Appl. No.: 748,448

[22] Filed: Aug. 22, 1991

[51] Int. Cl.$^5$ .......................................... B01D 24/46
[52] U.S. Cl. ................................. 210/232; 210/323.2; 210/333.01; 210/339; 210/346; 210/411; 210/486
[58] Field of Search ................. 55/342, 350, 484, 493; 210/232, 238, 322, 323, 323.2, 333.01, 346, 409, 411, 486, 339

[56] References Cited

U.S. PATENT DOCUMENTS

| | | | |
|---|---|---|---|
| 4,713,174 | 12/1987 | Zievers | 210/323.2 |
| 4,725,356 | 2/1988 | Zievers et al. | 210/323.2 |
| 5,069,786 | 12/1991 | Pulek | 210/232 |
| 5,074,999 | 12/1991 | Drari | 210/333.01 |

Primary Examiner—Robert A. Dawson
Assistant Examiner—W. L. Walker
Attorney, Agent, or Firm—Lalos & Keegan

[57] ABSTRACT

A filter-collector apparatus comprising a closed vessel having in inlet for introducing pneumatically conveyed material thereinto and an outlet for discharging material therefrom, a detachable tube sheet disposed in the vessel and cooperating with the vessel to provide a material collector chamber and a plenum chamber, wedging means for detachably securing the tube sheet to the vessel, at least one filter tube extending through an opening in the tube sheet and into the collector chamber, having the interior thereof communicating with the plenum chamber, wedging means for detachably securing the filter tube to the tube sheet, means disposed in the plenum chamber for selectively injecting a stream of fluid under pressure into the filter tube for dislodging filtered material deposited on the filter tube, means for detachably securing the fluid injecting means to the tube sheet and the vessel having outlet means communicating with the plenum chamber.

54 Claims, 6 Drawing Sheets

FILTER-COLLECTOR APPARATUS

This invention relates to a filter-collector apparatus and more particularly to a filter-collector apparatus adapted for use in pneumatic conveying systems for transporting bulk materials which may be quickly disassembled for cleaning and other purposes and then quickly reassembled.

Conventional filter-collectors utilized in pneumatic conveying systems typically include a vessel providing a collector chamber having an inlet for introducing pneumatically conveyed bulk materials thereinto and an outlet for discharging filtered material therefrom, and a filter unit integrated with the vessel for separating the material from the conveying air stream. Generally, the filter unit includes a housing formed integrally with the vessel housing, a tube sheet mounted in the filter housing to provide a chamber communicating or coinciding with the collector chamber of the vessel and a plenum chamber, a set of filter tubes mounted on the tube sheet, projecting into the collector chamber and having the interiors thereof communicating with the plenum chamber, and a jet pipe arrangement disposed in the plenum chamber for periodically injecting pulsating jet streams of air into the filter tubes for dislodging filtered material deposited on the filter tubes.

Periodically, it is necessary to disassemble such units to clean or otherwise service them. Because of loss of production time when such units are down, it is highly desirable to be able to quickly disassemble and reassemble such units. It further is desirable that such units be designed and constructed in a manner whereby they not only would be adapted to be quickly disassembled and reassembled but would be free of small recesses, crevises or cavities in which material may lodge requiring increased time and effort to remove.

In certain applications where large bulks of toxic or otherwise hazardous material may be processed, it particularly is desirable to be able to quickly disassemble the unit, physically enter the unit to clean or service it, exit the unit and rapidly reassemble it and return it to production with a minimum loss of time. In such applications it is not only desirable to rapidly disassemble, clean and reassemble the unit but critical that all of the toxic or otherwise hazardous material be removed from the unit so as not to contaminate subsequent batches of material being processed or otherwise produce harmful effects to operating personnel, subsequent processing, working conditions or the environment.

Accordingly, it is the principal object of the present invention to provide an improved filter-collector apparatus.

Another object of the present invention is to provide an improved filter-collector apparatus adapted for use in pneumatic conveying systems.

A further object of the present invention is to provide an improved filter-collector unit which may be quickly disassembled and reassembled for cleaning and other servicing purposes.

A still further object of the present invention is to provide an improved filter-collector apparatus which is free of recesses, crevises, niches and other cavities in which material being processed may lodge and be difficult to remove.

Another object of the present invention is to provide an improved filter-collector apparatus which particularly is adapted for processing bulk quantities of toxic or otherwise hazardous material.

A further object of the present invention is to provide a novel filter-collector apparatus which may be readily disassembled to allow ingress and egress of an attendant for cleaning or servicing purposes, and rapidly reassembled to minimize loss of production time.

A still further object of the present invention is to provide an improved filter-collector apparatus particularly suitable for use in pneumatic conveying systems in the chemical and pharmaceutical industries.

Another object of the present invention is to provide a novel filter-collector apparatus which is comparatively simple in design, relatively inexpensive to manufacture and highly effective in performance.

Other objects and advantages of the present invention will become more apparent to those persons having ordinary skill in the art to which the present invention pertains from the following description taken in conjunction with the accompanying drawings wherein;

Referring to the drawings there is shown a filter-collector apparatus which is adapted to be used in a pneumatic conveying system for transporting bulk quantities of material. The apparatus is operable to separate the material being conveyed from the conveying air stream and generally includes a vessel 30 and a filter unit 31 formed integrally with the vessel. The vessel generally includes a vertically disposed, cylindrical wall 32 having a closed upper end 33 and a closed lower end 34 defining a closed collector chamber 35. Material being pneumatically conveyed in the system is introduced into the collector chamber through an inlet 36, and filtered material deposited in the collector chamber may be discharged from the vessel through an outlet in the lower end of the vessel which may include a flow control valve or an air lock.

Figure 2:
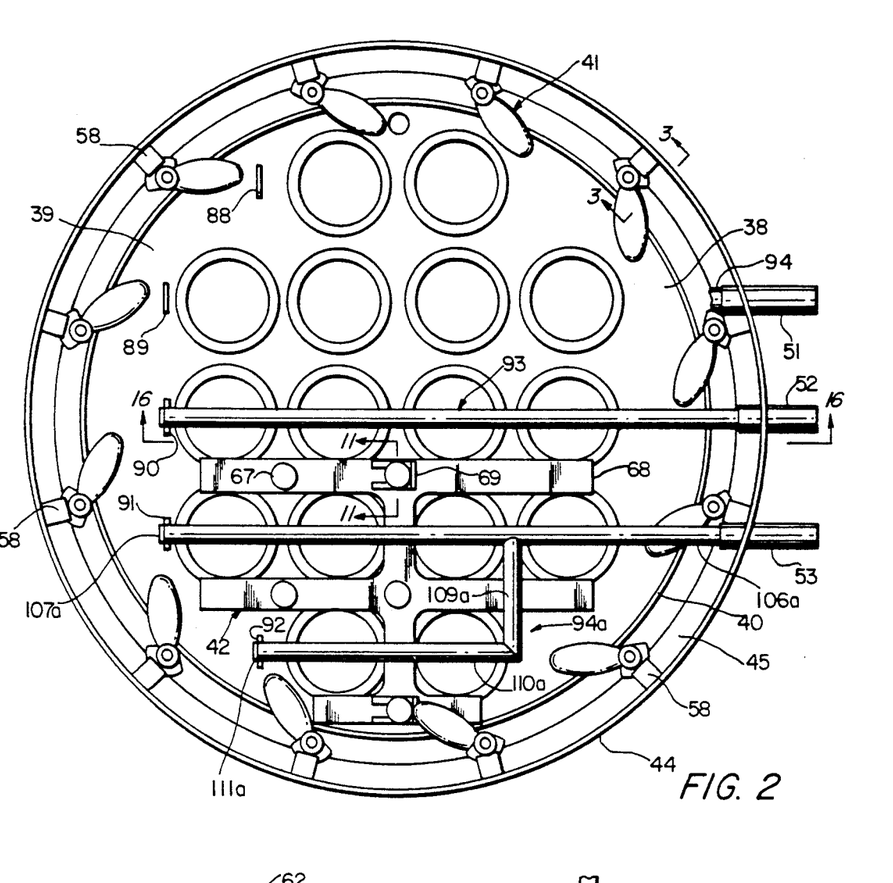
FIG. 2 is an enlarged cross-sectional view taken along line 2—2 in FIG. 1.
Figure 3:
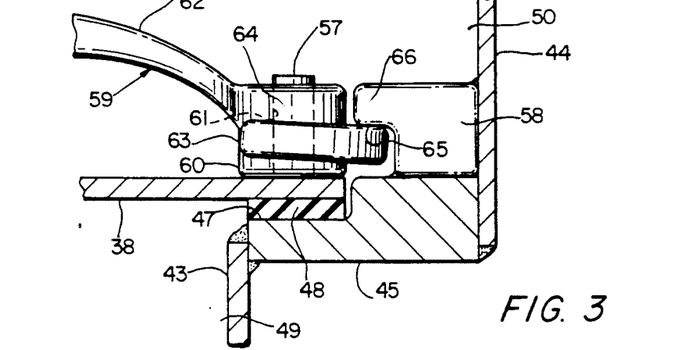
FIG. 3 is an enlarged cross-sectional view taken along line 3—3 in FIG. 2.
Figure 4:
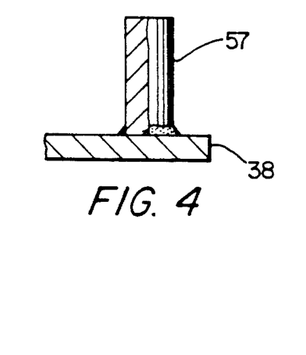
FIG. 4 is a side elevational view of the pivot pin shown in FIG. 3 having a proportion thereof broken away.
Figure 5:
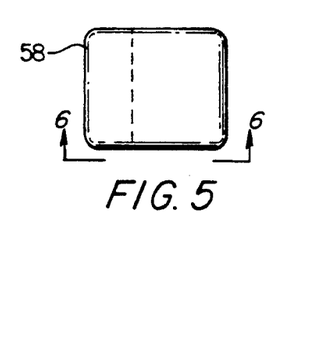
FIG. 5 is a top plan view of the lug shown in FIG. 3.
Figure 16:
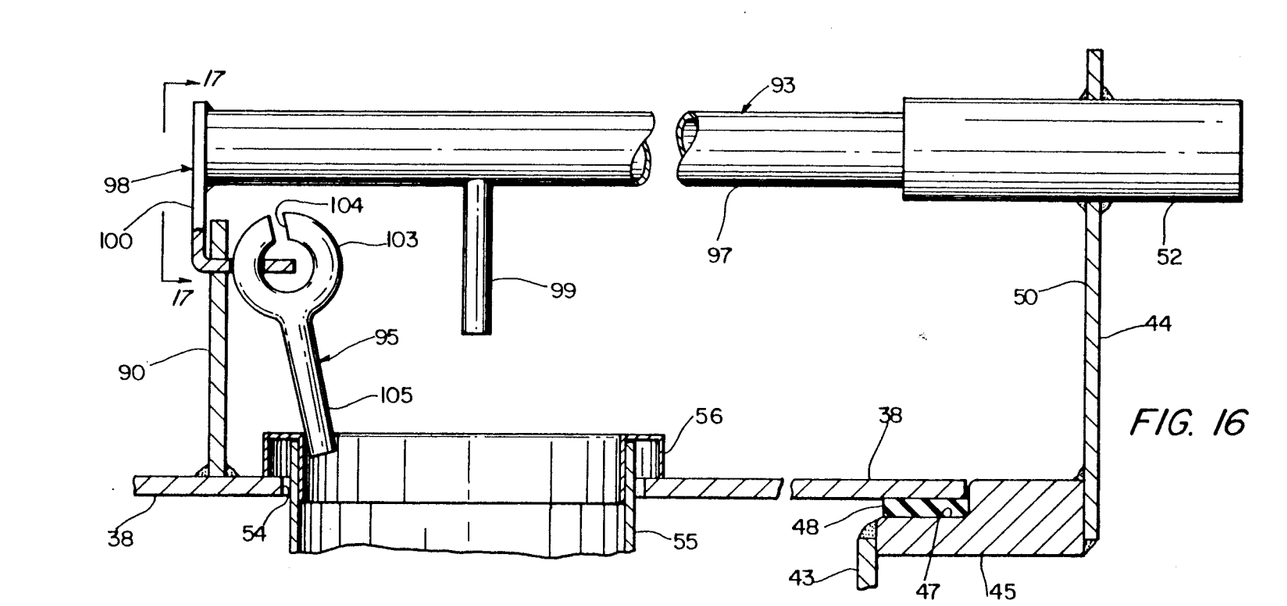
FIG. 16 is an enlarged cross-sectional view taken along line 16—16 in FIG. 2, illustrating a portion in cross-section and having portions thereof broken away.

Filter unit 31 generally includes a filter housing 37, a tube sheet 38 as best shown in FIGS. 2, 3 and 16, a set of filter tubes 39 and a jet pipe arrangement 40 for back washing or cleaning the filter tubes in the conventional manner. The tube sheet is detachably secured to the filter housing by means of a plurality of wedging or clamping assemblies 41 cirumferentially spaced about the periphery of the tube sheet, and the filter tubes are detachably secured to the tube sheet by a set of holddown or retainer assemblies 42.

Filter housing 37 includes a lower cylindrical wall member 43 disposed at an acute angle relative to the vertical centerline of vessel 32 and is secured at its lower end to side wall 32 of the vessel so that the interior thereof communicates or coincides with collector chamber 35. The upper end of the filter housing includes a cylindrical wall member 44 having a diameter slightly larger than the diameter of wall member 43, an annular seating flange 45 disposed between wall members 43 and 44 and a removable access cover 46. As best shown in FIG. 3, seating flange 45 is recessed as at 47 which provides an annular surface on which tube sheet 38 is seated. An annular gasket 48 is interposed between tube sheet 38 and seating flange 45 to provide an airtight seal between the tube sheet and the filter housing. As will be appreciated, tube sheet cooperates with the housing walls and access cover of the filter unit to provide a collector chamber portion 49 communicating or coinciding with collector chamber 35 of vessel 30, and a plenum chamber 50. As best shown in FIGS. 2 and 16, a set of air supply nipples 51, 52 and 53 are mounted in suitable openings in plenum chamber wall 44 which are adapted to be connected with a source of fluid under pressure and suitable controls for periodically supplying pulses of streams of air under pressure to the jet pipe arrangement as later will be described.

Figure 1:
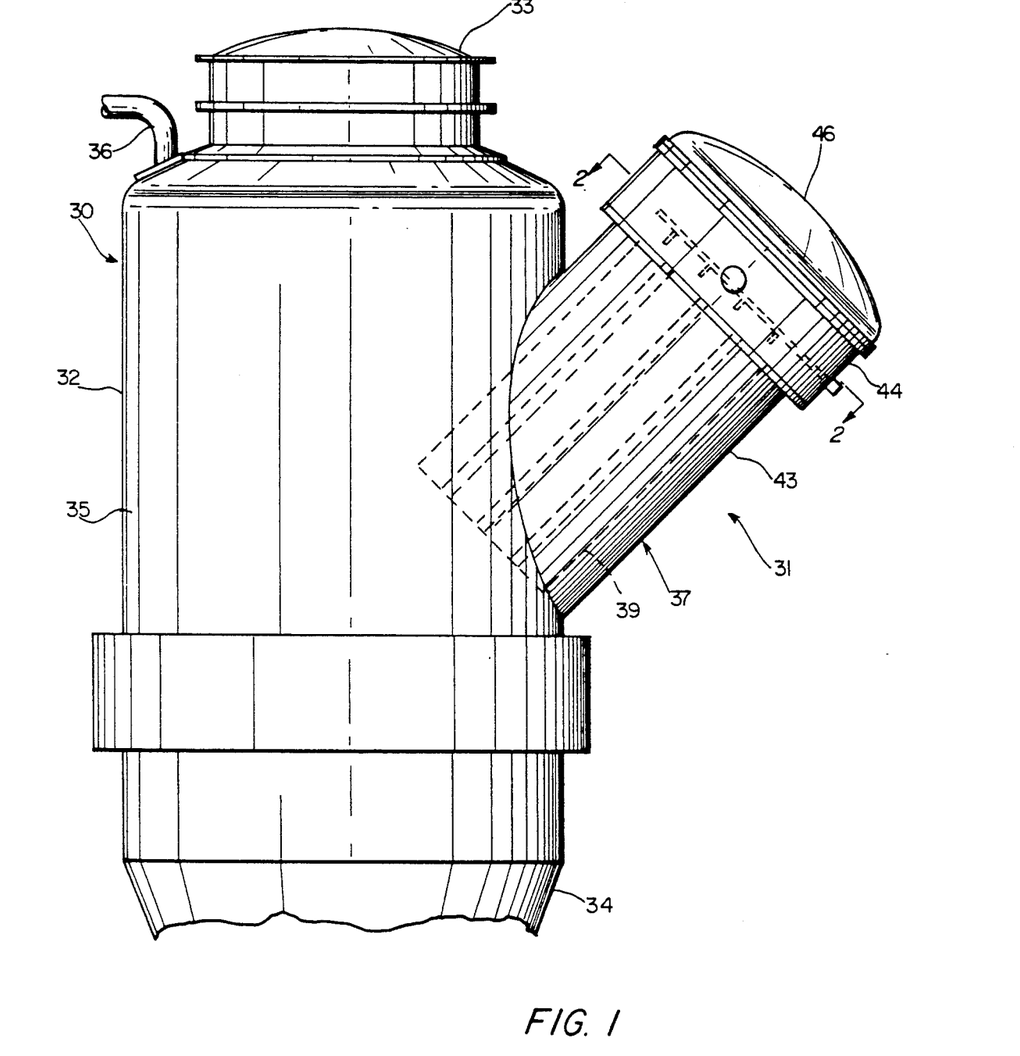
FIG. 1 is a side elevational view of a filter-collector apparatus embodying the present invention.

Tube sheet 38 essentially consists of a circular plate member provided with a plurality of parallel rows of filter tube receiving openings 54. As best shown in FIG. 2, the rows are disposed in parallel relation and the three interior rows are adapted to be positioned in alignment with nipples 51 through 53. Filter tubes 39 are of a conventional construction, each consisting of a wire cage 55, a cloth filter medium or sock disposed on the wire cage and a collar member 56 formed on the open end of the filter cage. In the conventional manner, the filter tube projects through a filter tube opening 54 in the tube sheet into the collector chamber and is supported by the seating of the collar member on the tube sheet, with the interior of the filter tube communicating with the plenum chamber. As will be appreciated from FIG. 1, air laden with material being transported, introduced into vessel 30, will be drawn through the filter tubes causing the conveyed material to be filtered out by the filter tubes and fall to the bottom of the vessel where it is discharged from the unit.

Figure 8:
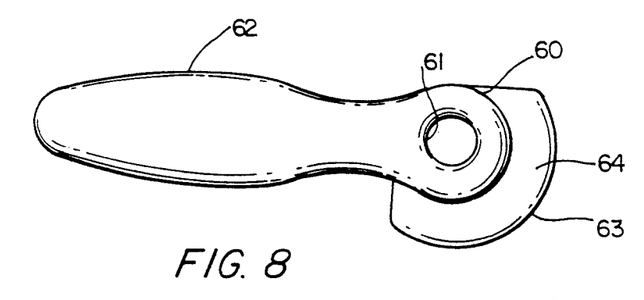
FIG. 8 is a top plan view of the wedging member shown in FIGS. 3 and 7.
Figure 9:
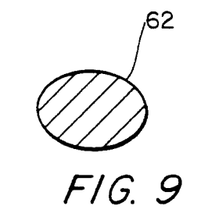
FIG. 9 is a cross-sectional view taken along line 9—9 in FIG. 7.

Referring to FIGS. 3 through 8, there is illustrated a tube sheet clamping assembly generally consisting of a pin member 57, a lug member 58 and a wedge member 59. As best shown in FIG. 2, pin members 57 are secured to the outer surface of the tube sheet adjacent the edge thereof and are circumferentially spaced about the perimeter thereof. Lug members 58 are secured to seating flange 45 and plenum chamber wall 44 and are circumferentially spaced at intervals corresponding to the spacing between pin members 57. Each of wedge members 59 is adapted to be mounted on a pin member and cooperate with a registered lug member to clamp the tube sheet between the wedge member and the seating flange as shown in FIG. 3. Each wedge member includes a cylindrical main body portion 60 having an axially disposed opening 61 for receiving a pin member 57 therein, a handle portion 62 disposed substantially radially relative to the axis of pin receiving opening 61 and a flange portion 63 having an inclined or spiraled surface 64 which is adapted to engage an underside 65 of a protruding portion 66 of a lug member when the wedge member is mounted on a pin member and rotated about the pin member with the handle portion 62 to provide a camming action and correspondingly a downward movement of the wedge member to clamp the tube sheet between the wedge member and the seating flange. As best shown in FIG. 8, flange portion 63 extends about a sector of approximately 90 degrees relative to the axis of opening 61 so that when the wedge member is positioned on the pin member, the flange portion of the wedge member will be clear of the protruding portion of the lug member thus permitting the wedge member to be rotated less than 90 degrees to cam the wedge member downwardly to provide the clamping action. Preferably, the pin members may be formed of stock rod material, the lug and wedge members may be cast and the pin and lug members may be secured to the tube sheet and seating flange and plenum chamber wall by welding.

Figure 11:
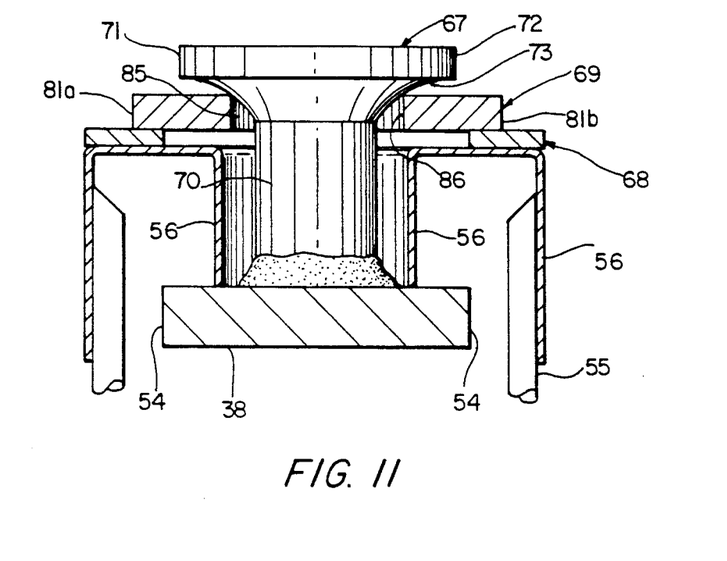
FIG. 11 is an enlarged, cross-sectional view taken along 11—11 in FIG. 2.

Retainer assembly 42 functions to hold the filter tubes in position on the tube sheet and consists of a plurality of pins or studs 67 formed on the outer side of the tube sheet, a set of hold-down bar members 68 and a plurality of wedge members 69. The pin or stud members are located between and adjacent tube sheet openings 54. As best shown in FIG. 11, each of them consists of a main body portion 70 and a head portion 71 having an underside thereof curving inwardly and downwardly from an outer edge 72 thereof to provide a downwardly facing cam surface 73. Preferably, the pin or stud members are machined from stock material and secured to the outer face of the tube sheet by welding.

Figure 10:
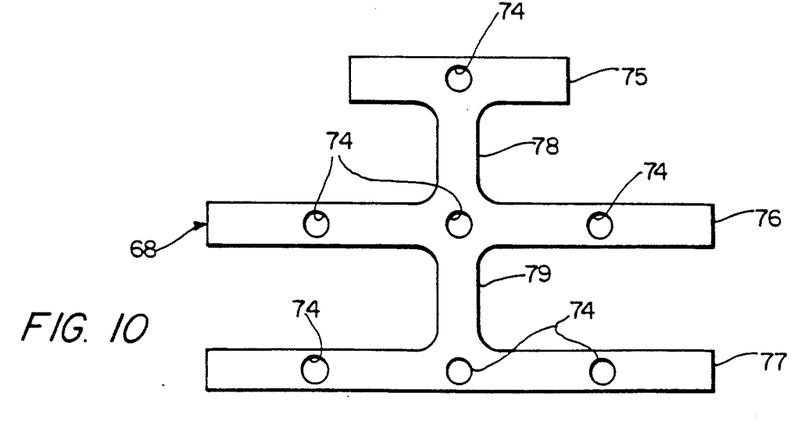
FIG. 10 is a top plan view of the hold-down bar member shown in FIG. 2.
Figure 15:
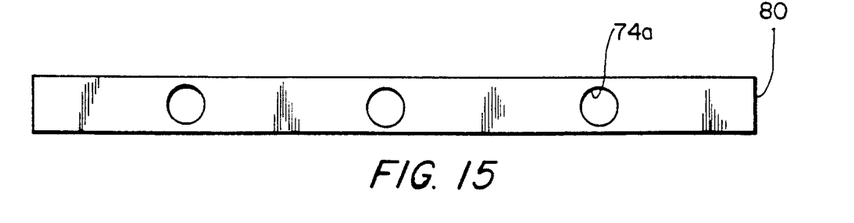
FIG. 15 is a top plan view of an alternate hold-down bar member adapted to be used in lieu of the hold-down bar member shown in FIGS. 2 and 10.

Each of hold-down bar members 68 is provided with a plurality of holes 74 adapted to receive stud members 67, and has a configuration adapted to overlie and engage collar portions of three rows of filter tubes when the member is disposed in an operative position with stud members 67 projecting therethrough. As best shown in FIGS. 2 and 10, each bar member 68 consists of a set of parallel portions 75, 76 and 77 provided with openings 74, and a pair of connecting portions 78 and 79. Alternatively, the bar members may be formed of a plurality of single strips 80 provided with stud receiving openings 74a as shown in FIG. 15. Preferably, however, hold-down bar members as shown in FIGS. 2 and 10 are used which provide fewer components thus facilitating and expediting the disassembly and reassembly of the filter unit.

Figure 12:
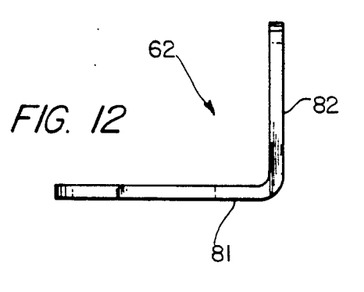
FIG. 12 is a side, elevational view of a wedging member as shown in FIGS. 2 and 11 used in conjunction with the hold-down bar member shown in FIGS. 2 and 10.
Figure 13:
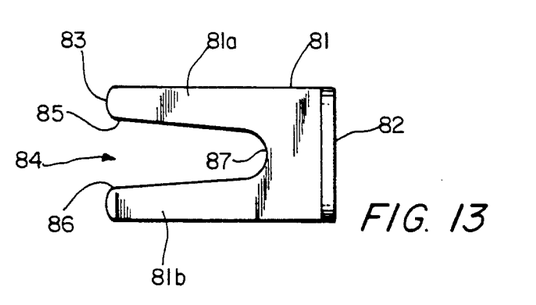
FIG. 13 is a top plan view of the wedging member shown in FIG. 12.
Figure 14:
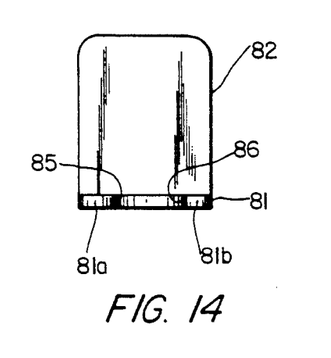
FIG. 14 is a front elevational view of the wedging member shown in FIGS. 12 and 13.

Referring to FIGS. 12 through 14, each wedge member 69 is seen to comprise a plate member having a planar bottom section 81 and an upright section 82 disposed substantially at a right angle relative to bottom section 81. The front edge 83 of the bottom section is provided with a recess 84 having a pair of opposed, converging edges 85 and 86 merging into a curved inner edge 87. Upright section 82 is formed sufficiently large to permit it to be gripped by the fingers so that bottom section 81 may be inserted between a bar member 68 seated on a set of filter tube collars as shown in FIG. 2, and the head portion of a pin member 67 projecting through an opening 74 of the bar member so that the main body portion of the pin is received within recess 84 with leg portions 81a and 81b straddling the main body portion of the pin member and the upper corners of converging edges 85 and 86 engaging the curved underside 73 of the pin member. As the wedge member is thus inserted between the head portion of a pin member and the bar member, the wedge member will be cammed downwardly to clamp the collar portions of the filter tubes between the bar member and the tube sheet. The wedge members may consist of steel or any other suitable material and may be formed by stamping and bending them from plate or sheet material.

Jet pipe arrangement 40 includes a set of stanchions 88 through 92, a center pipe or conduit 93, a pair of side pipes or conduits 94 and a locking key 95. As best shown in FIG. 2, stanchions 88 through 92 are located at one set of ends of sets of filter tube openings in the tube sheet so that when the tube sheet is properly oriented relative to the filter housing, stanchion 88 will be disposed in alignment with the centers of two adjacent filter tube openings, stanchion 89 will be in alignment with the centers of a set of four filter tube openings and air supply nipple 51, stanchion 90 will be in alignment with the centers of four adjacent filter tube openings and air supply nipple 52, stanchion 91 will be disposed in alignment with the centers of an adjacent set of filter tube openings and air supply nipple 53 and stanchion 92 will be in alignment with the centers of two adjacent filter tube openings. Preferably, means are provided on the filter housing which cooperates with a portion of the tube sheet to properly orient the tube sheet in the position as described. Such a means may consist of a small notch or indentation in the periphery of the tube sheet which is adapted to receive a protruding portion of the seating flange to properly orient the tube sheet.

Figure 20:
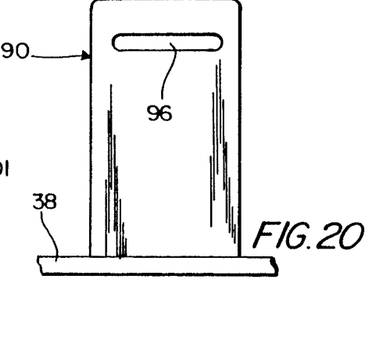
FIG. 20 is a front elevational view of the stanchion shown in FIG. 16.

Stanchion 90 shown in FIG. 20 is typical of the several stanchions described and essentially consists of a plate member rigidly secured, preferably by welding, at its lower end to the outer face of the tube sheet, and provided with a slot 93 at an upper end thereof which is disposed substantially parallel to the internal passageway of air supply nipple 52. Similarly, the slots formed in the upper ends of the other stanchions are disposed parallel to the internal passageways of air supply nipples 51 through 53.

Figure 17:
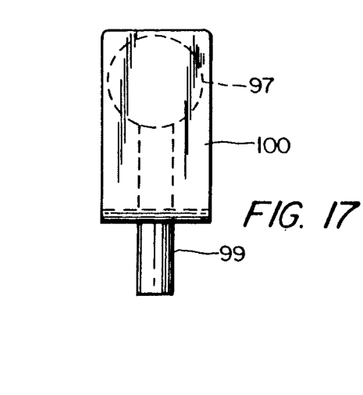
FIG. 17 is a cross-sectional view taken along line 17—17 in FIG. 16.
Figure 18:
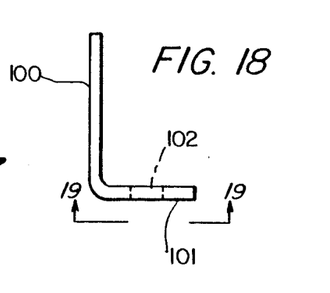
FIG. 18 is a side elevational view of the locking clip shown in FIG. 17.
Figure 19:
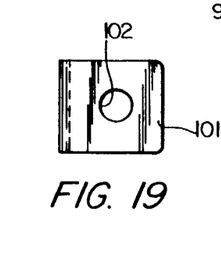
FIG. 19 is a cross-sectional view taken along line 19—19 in FIG. 18.

Jet pipe 93 consists of an elongated conduit or tubular section 97, a locking clip 98 formed on an outer end of the tubular section and cooperable with stanchion 90, and a plurality of nozzles 99 cooperable with a set of filter tubes. As best shown in FIG. 16, an inner end of tubular section 97 is adapted to be received within air supply nipple 52. Locking clip 98 is best seen in FIGS. 17 through 19 and consists of a plate section 100 secured to and covering the outer end of tubular section 97 and an offset plate section 101 which is disposed substantially parallel to the centerline of tubular section 97 and is adapted to be received in slot 96 of stanchion 90 when the inner end of tubular section 97 is received within air supply nipple 52. Plate section 101 of the locking clip is provided with an opening 102 therein which is adapted to receive a portion of locking key 95 therethrough to lock jet pipe 93 in position as shown in FIGS. 2 and 16.

Figure 6:
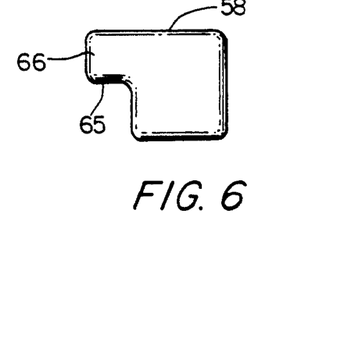
FIG. 6 is a cross-sectional view taken along line 6—6 in FIG. 5.
Figure 7:
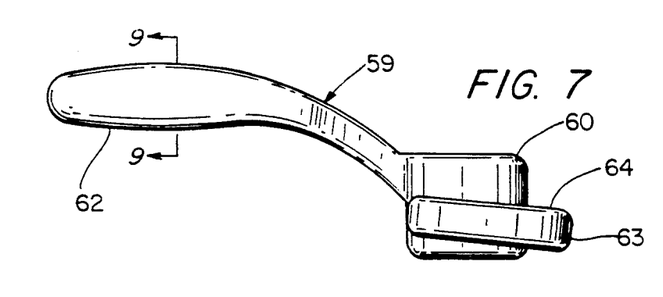
FIG. 7 is a side elevational view of the wedging member shown in FIG. 3.

Locking key 95 consists of a ring portion 103 having a slot 104 therein and a handle portion 105 which is disposed radially relative to ring portion 103 and in alignment with slot 104. With the locking clip inserted in the slot of stanchion 90 as shown in FIG. 16, the locking key may be connected to the locking clip to lock jet pipe 93 in position as shown by aligning slot 104 with plate section 101 of the locking clip, manuvering the locking key so that plate section 101 is received within slot 104 and the opposed surfaces of the slot are aligned with opening 102 in plate section 101, and then passing the ring portion through opening 102 to the position shown in FIG. 16 thus precluding the locking clip from being withdrawn from slot 96 in stanchion 90. When released, the weight of the handle portion of the locking key will swing down and thus functions to maintain the locking key in the position as shown in FIG. 6 with slot 104 out of alignment with plate section 101 which precludes the removal of the locking key.

Figure 24:
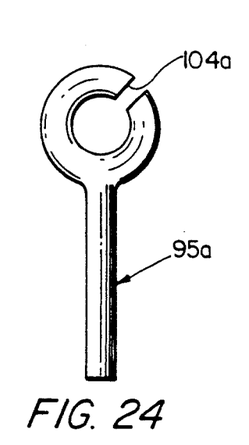
Figure 25:
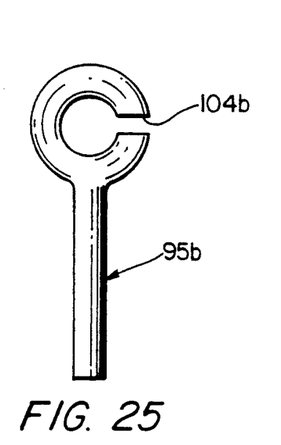

As shown in FIGS. 24 and 25, the slot in ring portion 103 of the locking key can be offset less than 180 degrees relative to the handle including 120 degrees as shown in FIG. 24 and 90 degrees as shown in FIG. 25.

When jet pipe 93 is in the position as shown in FIGS. 2 and 16, tubular section 97 will overly a set of four filter tubes and nozzles 99 will be directed to the interiors of such filter tubes whereby upon connecting air supply nipple 52 with a source air under pressure, nozzles 99 will inject jets of air into the interiors of the filter tubes to dislodge filtered material deposited on the filter medium of the tubes. Typically, air supply nipple 52 will be connected to a source of air pressure provided with suitable controls to periodically provide a pulsating supply of pressurized air to the filter tubes to dislodge filtered material.

Figure 21:
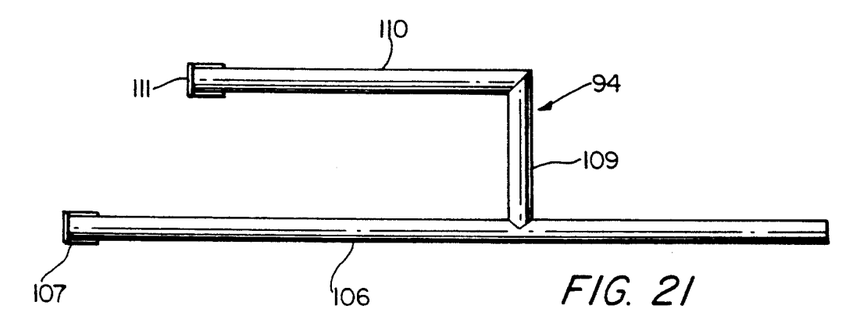
FIG. 21 is a top plan view of the jet pipe partially shown in FIG. 2.
Figure 22:
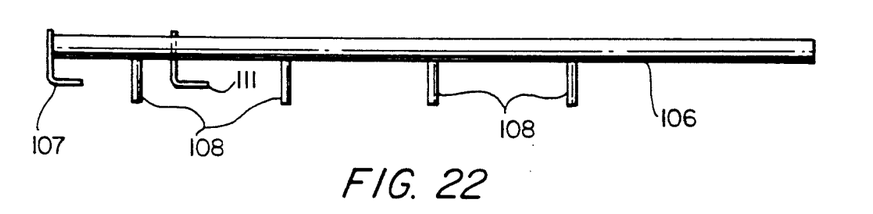
FIG. 22 is a side elevational view of the jet pipe shown in FIG. 21.
Figure 23:
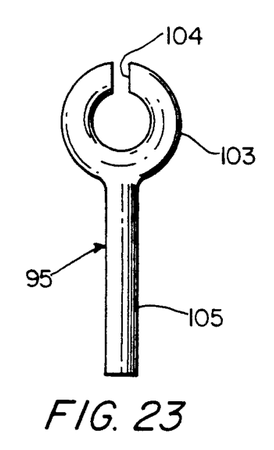
FIGS. 23, 24 and 25 illustrate different forms of locking keys which may be used with the jet pipe assemblies shown in FIGS. 2 and 16.

As best shown in FIGS. 2, 21 and 22, jet pipe 94 includes a main conduit section 106 having a locking clip 107 comparable to locking clip 98 and a plurality of nozzles 108 comparable to nozzles 99, a connecting conduit section 109 and a branch conduit section 110 having a locking clip 111 comparable to locking clips 98 and 107 and a pair of nozzles comparable to nozzles 99 and 108. As partially shown in FIG. 2, the free end of conduit section 106 of jet pipe 94 is adapted to be inserted in nipple 51 as locking clips 107 and 111 are inserted in the slots of stanchions 89 and 88 so that conduit section 106 will overlie a row of four filter tubes, and branch conduit section 110 will overlie a row of two filter tubes with the nozzles thereof projecting downwardly for injecting jets of air streams into the interiors of such tubes. Jet pipe 94a is comparable to jet pipe 94 and includes a main conduit section 106a having the free end thereof insertable in air supply nipple 53 and a locking clip 111a inserted in the slot of stanchion 91 so that it overlies a row of four filter tubes with the nozzles thereof directed to the interiors of such tubes, connecting conduit section 109a and a branch conduit section 110a having a locking clip 111a received within a slot of stanchion 92 so that it overlies a pair of filter tubes with a pair of nozzles directed downwardly toward the interiors of such tubes. Jet pipes 94 and 94a are adapted to be locked in the positions as described by means of locking keys of the types as shown in FIGS. 23, 24 and 25.

In the use of the filter-collector as described, the unit may be installed in a pneumatic conveying system so that pneumatically conveyed material may be introduced into the vessel through inlet 36 and filtered material may be discharged out of the bottom end of the vessel. Air may be drawn from the vessel by applying a negative pressure to plenum chamber 50 in the conventional manner. Filtered material deposited on the filter tubes may be removed by periodically connecting the jet pipes to a source of pressurized air in the conventional manner. Typically, a diaphram valve may be used to supply pulsating streams of air under approximately 90 psig. to the filter tubes to dislodge the filtered material. The controls on the manifold supplying pressurized air to nipples 51, 52 and 53 operate in a manner whereby pulsating jets of air are supplied to the nipples sequentially so that the unit will operate continuously as one out of the three sets of filter tubes is being cleaned.

In some applications where large bulks of toxic material are being processed, as in the pharmaceutical industry, offset section 37 is formed with a diameter sufficiently large to enable an attendant dressed with appropriate outer protective wear to open access door 46, remove the jet pipes, filter tubes and tube sheet, insert a ladder into the vessel through offset section 37, climb into the vessel to clean the interior thereof, exit the vessel, remove the ladder, reassemble the tube sheet, filter tubes and jet pipes, close access door 46 and return the unit to operation.

The inclination of the offset section of the unit containing the filter unit greatly facilitates the ingress and egress of the unit for cleaning purposes. The particular construction and detachability of the filter tube retainer means, tube sheet retainer means and the jet pipe arrangement greatly facilitates their disassembly and reassembly during such a cleaning operation and further minimizes the cleaning operation inasmuch as the configuration thereof eliminates various crevises, niches and cavities characteristic of prior art fastening and retaining means such as threaded connections and the like.

To obtain access to the interior of the unit through offset section 37, the jet pipes are first removed, the filter tubes are next removed and the tube sheet is finally removed. The jet tubes are removed merely by grasping the handles of the locking keys, pivoting them to align slots 104 with the planar sections 101 of the locking clips and then withdrawing them, sliding the tubes out of the air supply nipples and setting them aside. The filter tubes are then freed up by removing wedging members 69 and removing the hold down members 68. The filter tubes are then freed to be removed by drawing them out of the tube sheet and placing them aside. Finally, the tube sheet may be removed simply by pivoting each of the handles of wedge members 59 to clear the protruding portions 65 from the lug members 58 to permit the tube sheet to be grasped through the tube openings and easily removed and set aside. The unit may then be readily accessed for cleaning or other purposes as previously described.

After the unit has been cleaned or otherwise serviced, the filter unit may be reassembled essentially by reversing the aforementioned procedure. Initially, gasket 48 and the tube sheet may be positioned on support flange 45. The filter tube openings will be properly aligned relative to air supply nipples 51 through 53 by aligning a notch in the periphery thereof with a locator lug provided on the support flange. Wedge members 41 then may be placed on the locking pins and rotated to engage lug numbers 58 and thus clamp the tube sheet firmly in place between the wedge members and the gasket seated on the support flange. The filter tubes with either cleaned or replacement filter socks are inserted through the tube sheet openings into operating positions. The filter tubes are then secured in position by placing bar members 58 on the tube collars with studs 67 projecting through the openings thereof. Wedge members 69 are then applied to clamp the filter tube collars between the bar members and the tube sheet. Jet pipes 93, 94 and 94a are then installed by inserting the free ends thereof in the air supply nipples while inserting the locking clips in the slots of stanchions 88 through 92, and then securing the pipes in place by means of a set of locking keys.

It thus will be seen that there is provided a filter-collector which has a design and configuration that not only provides a minimum of recesses, crevises and cavities in which a product being processed may lodge but which provides a filter unit that may be rapidly disassembled and reassembled following a cleaning or other operation for minimizing the downtime of the apparatus and attendant loss of production.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:
1. A filter-collector apparatus comprising:
a closed vessel having an inlet for introducing pneumatically conveyed material thereinto and an outlet for discharging material therefrom:
a detachable tube sheet disposed in said vessel and cooperating with said vessel to provide a material collector chamber and a plenum chamber;
wedging means for detachably securing said tube sheet to said vessel and camming said tube sheet against said vessel;
at least one filter tube extending through an opening in said tube sheet and into said collector chamber, having the interior thereof communicating with said plenum chamber;
wedging means for detachably securing said filter tube to said tube sheet and camming said filter tube against said tube sheet;
means disposed in said plenum chamber for selectively injecting a stream of fluid under pressure into said filter tube for dislodging filtered material deposited on said filter tube;
means for detachably securing said fluid injecting means to said tube sheet; and said vessel having outlet means communicating with said plenum chamber.

2. A filter-collector apparatus according to claim 1 wherein said wedging means for detachably securing said tube sheet to said vessel comprises:

means disposed on one of said vessel and said tube sheet providing a wedge engaging surface; and a wedge member insertable between the other of said vessel and said tube sheet and said wedge engaging surface for urging said tube sheet in seating engagement with said vessel.

3. A filter-collector apparatus according to claim 2 including a plurality of sets of said wedge engaging surfaces and wedge members spaced about the periphery of said tube sheet.

4. A filter-collector apparatus according to claim 1 wherein said wedging means for detachably securing said tube sheet to said vessel;

includes a lug member disposed on one of said vessel and said tube sheet, providing a surface facing said collector chamber defining a wedge engaging surface;

includes a pin rigidly mounted on the other of said vessel and tube sheet, adjacent said lug member; and wherein said wedge member is detachably pivotally mountable on said pin, having an inclined surface engageable in wedging relation with the wedge engaging surface of said lug member when said wedge member is mounted on said pin and pivoted about an axis of said pin.

5. A filter-collector apparatus according to claim 4 wherein said wedge member includes an axial opening for receiving said pin therein, a spiral surface enagageable with said wedge engaging surface and a handle for pivoting said wedge member about said pin.

6. A filter-collector apparatus according to claim 5 including a plurality of sets of said lug members, pins and wedge members spaced about a periphery of said vessel and wherein each of said pins is mounted on said tube sheet and said lug members are mounted on said vessel.

7. A filter-collector apparatus according to claim 2 including a gasket disposed between said vessel and said tube sheet.

8. A filter-collector apparatus according to claim 1 wherein said wedging means for detachably securing said filter tube to said tube sheet comprises:

at least one pin member rigidly mounted on said tube sheet, having a head portion;

a bar member having an opening therein for receiving said pin member therethrough when an underside thereof engages at least a portion of a filter tube collar; and a wedging member insertable between said bar member and the head portion of said pin member in wedging relation when said bar member engages the collar portion of said filter tube and said pin is received through the opening in said bar member, whereby the collar portion of said filter tube is firmly clamped between said bar member and said tube sheet.

9. A filter-collector apparatus according to claim 8 wherein said wedging means for detachably securing said tube member to said tube sheet includes a number of sets of said pin, bar and wedge members, each of said sets retaining at least two filter tubes.

10. A filter-collector apparatus according to claim 8 wherein said bar member is sized and configured to engage a plurality of filter tube collars.

11. A filter-collector apparatus according to claim 8 wherein an underside of the head portion of said pin member is curved from an outer end thereof inwardly and longitudinally relative to an elongated main body portion thereof to provide a camming surface engageable by said wedging member.

12. A filter-collector apparatus according to claim 8 wherein said wedging member of said wedging means for detachably securing said filter tube to said tube sheet includes a plate portion insertable between the head portion of said pin member and said bar member when said pin member is received through said opening, said plate portion having a converging recess for receiving an elongated main body portion of said pin member therein.

13. A filter-collector apparatus according to claim 12 wherein said wedge member of said wedging means for detachably securing said filter tube to said tube sheet includes an offset portion which may be grasped manually to insert the wedging member between the head portion of the pin member and the bar member.

14. A filter-collector apparatus according to claim 8 wherein an underside of the head portion of said pin member is curved from an outer end thereof inwardly and longitudinally relative to an elongated main body portion thereof to provide a camming surface, and said wedging member of said wedging means for securing said filter tube to said tube sheet includes a plate portion insertable between the head portion of said pin member and said bar member when said pin member is received through said opening, said plate portion having a converging recess for receiving the elongated main body portion of said pin member therein as upper edges of said plate portion along said recess engage said curved underside of said head portion to provide a clamping action.

15. A filter-collector apparatus according to claim 14 wherein said wedge member of said wedging means for securing said filter tube to said tube sheet includes an offset portion which may be grasped manually to insert the wedging member between the head portion of said pin member and said bar member.

16. A filter-collector apparatus according to claim 1 wherein said means disposed in said plenum chamber for selectively injecting a stream of fluid under pressure into said filter tube for dislodging filtered material deposited on said filter tube and said means for detachably securing fluid injecting means into said filter tube include:

means mounted on said tube sheet providing a guideway disposed substantially parallel to an internal passageway of a nipple mounted on said vessel and communicable with a source of fluid under pressure;

a conduit removably insertable into an operative position in said internal passageway of said nipple, overlying an open end of said filter tube;

said conduit having a locking clip insertable in said guideway;

said conduit having a nozzle directed toward the interior of said filter tube for receiving fluid under pressure from said nipple and conduit and injecting it into the interior of said filter tube for dislodging filtered material deposited on the outer surfaces of said filter tube; and means for detachably securing said conduit in said operative position.

17. A filter-collector apparatus according to claim 16 wherein said conduit overlies a plurality of open ends of filter tubes when in the operative position and includes a plurality of nozzles each directed to the interior of a filter tube.

18. A filter-collector apparatus according to claim 16 wherein said conduit is provided with a branch section which overlies the open end of at least one additional filter tube when in the operative position, and said branch section includes a nozzle directed toward the interior of said additional filter tube for receiving fluid under pressure through said nipple and conduit an injecting it into the interior of said additional filter tube.

19. A filter-collector apparatus according to claim 18 wherein said conduit branch section overlies a plurality of open ends of filter tubes when in the operative position and includes a plurality of nozzles each directed toward the interior of a filter tube.

20. A filter-collector apparatus according to claim 18 including a second means providing a guideway disposed substantially parallel to the internal passageway of said nipple and wherein said conduit branch section includes a locking clip insertable in said guideway when said conduit is in the operative position; and
second means for detachably securing said conduit in the operative position.

21. A filter-collector apparatus according to claim 16 wherein said means mounted on said tube sheet providing said guideway comprises a stanchion secured to said tube sheet, said guideway comprises a slot in said stanchion, said locking clip includes a tab with an opening therein, insertable through said slot when said conduit is inserted into said nipple, and said means for detachably securing said conduit in said operative position comprises a locking key having a portion insertable in said tab opening when said tab is inserted through said stanchion slot to prevent said tab from being removed from said slot.

22. A filter-collector apparatus according to claim 21 when said locking key includes a ring portion having a slot therein whereby said ring portion may be manually manipulated to receive said tab portion within said ring portion slot and align an end portion of said ring portion with said tab opening and be turned to pass the ring portion through the tab portion opening thereby locking the conduit in the operative position.

23. A filter-collector apparatus according to claim 22 wherein said locking key includes a handle portion operable to gravity fall when said ring portion passes through said tab portion opening to misalign said ring portion slot with said tab portion opening thus precluding said locking key from disconnecting from said tab portion.

24. A filter-collector apparatus according to claim 23 wherein said handle is disposed radially relative to said ring portion.

25. A tube sheet assembly for a filter-collector apparatus including a vessel having a peripheral support flange disposed on an inner wall thereof comprising:
a plate member seated on said support flange and cooperating with said vessel to provide a collector chamber and a plenum chamber;
said plate member having means for supporting at least one filter tube thereon projecting into said collector chamber and having the interior thereof communicating with said plenum chamber;
means disposed on one of said vessel and said plate member providing a wedge engaging surface; and
a wedge member insertable between the other of said vessel and said plate member and said wedge engaging surface for camming said plate member into seating engagement with said support flange.

26. A tube sheet assembly according to claim 25 including a plurality of sets of said wedge engaging surfaces and wedge members spaced about the periphery of said plate member.

27. A tube sheet assembly according to claim 25 wherein said wedge engaging surface faces toward said collector chamber.

28. A tube sheet assembly according to claim 25 wherein said wedge member includes a spiral surface engageable with said wedge engaging surface and said wedge member is pivotal to position said spiral surface into wedging engagement with said wedge engaging surface.

29. A tube sheet assembly according to claim 28 wherein said wedge member includes a handle portion for pivoting the wedge member.

30. A tube sheet assembly according to claim 25:
including a lug member disposed on one of said support flange and said plate member, providing a surface facing said collector chamber defining said wedge engaging surface;
including a pin rigidly mounted on the other of said support flange and said plate member, adjacent said lug member; and
wherein said wedge member is detachably pivotally mountable on said pin, having an inclined surface engageable in wedging relation with the wedge engageable surface of said lug member when said wedge member is mounted on said pin and pivoted about an axis thereof.

31. A tube sheet assembly according to claim 30 wherein said wedge member includes an axial opening for receiving said pin therein, a spiral surface engageable with said wedge engageable surface and a handle for pivoting said wedge member about said pin.

32. A tube sheet assembly according to claim 31 including a plurality of sets of said lug members, pins and wedge members spaced about a periphery of said vessel and wherein said pins are mounted on said plate member and said lug members are mounted on said support flange.

33. A tube sheet assembly according to claim 25 including a gasket disposed between said support flange and said plate member.

34. In a filter-collector apparatus including a vessel, a tube sheet disposed in said vessel and cooperating with said vessel to provide a collector chamber and a plenum chamber, and at least one filter tube having a portion projecting through an opening in said tube sheet, a collar portion seated on said tube sheet about said opening and the interior thereof communicating with said plenum chamber, a filter tube retainer assembly comprising:
at least one pin member rigidly mounted on said tube sheet, having a head portion;
a bar member having an opening therein for receiving said pin member therethrough when an underside thereof engages at least a portion of the collar portion of said filter tube; and
a wedging member insertable between said bar member and the head portion of said pin member in wedging relation when said bar member is seated on the collar portion of said filter tube and said pin is received through the opening in said bar member, whereby the collar portion of said filter tube is firmly clamped between said bar member and said tube sheet.

35. A filter tube retainer assembly according to claim 34 including a number of sets of said pin, bar and wedge members, each retaining at least two filter tubes.

36. A filter tube retainer assembly according to claim 34 wherein said bar member is sized and configured to engage a plurality of said filter tube collars.

37. A filter tube retainer assembly according to claim 34 wherein an underside of the head portion of said pin member is curved from an outer edge thereof inwardly and longitudinally relative to an elongated main body portion thereof to provide a camming surface engageable by said wedging member.

38. A filter tube retainer assembly according to claim 34 wherein said wedging member includes a plate portion insertable between the head portion of said pin member and said bar member when said pin member is received through said opening, said plate portion having a converging recess for receiving an elongated main body portion of said pin member therein.

39. A filter tube retainer assembly according to claim 38 wherein said wedge member includes an offset portion which may be grasped manually to insert the wedging member between the head portion of said pin member and said bar member.

40. A filter tube retainer assembly according to claim 34 wherein an underside of the head portion of said pin member is curved from an outer edge thereof inwardly and longitudinally relative to an elongated body portion thereof to provide a camming surface, and said wedging member includes a plate portion insertable between the head portion of said pin member and said bar member when said pin member is received through said opening, said plate portion having a converging recess for receiving the elongated body portion of said pin member therein, as upper edges of said plate portion along said recess engage said curved underside of the head portion of said pin member to provide a clamping action.

41. A filter tube retainer assembly according to claim 40 wherein said wedge member includes an offset portion which may be grasped manually to insert the wedging member between the head portion of said pin member and said bar member.

42. In a filter-collector apparatus including a vessel, a tube sheet disposed on said vessel and cooperating with said vessel to provide a collector chamber and a plenum chamber, at least one filter tube having a portion thereof projecting through an opening in said tube sheet, a collar portion seated on said tube sheet about said opening and the interior thereof communicating with said plenum chamber, and a nipple mounted on said vessel and communicable with a source of fluid under pressure, a filter tube cleaning assembly comprising:
   means mounted on said tube sheet providing a guideway disposed substantially parallel to an internal passageway of said nipple;
   a conduit removably insertable in an operative position said internal passageway of said nipple, overlying an open end of said filter tube;
   said conduit having a locking clip insertable in said guideway;
   said conduit having a nozzle disposed in said plenum chamber and directed toward the interior of said filter tube for receiving fluid under pressure through said nipple and said conduit and injecting it into the interior of said filter tube for dislodging filtered material deposited on an outer surface of said filter tube; and position.

43. A filter tube cleaning assembly according to claim 42 wherein said conduit overlies a plurality of open ends of filter tubes mounted on said tube sheet when in the operative position and includes a plurality of nozzles each directed to the interior of a filter tube.

44. A filter tube cleaning assembly according to claim 42 wherein said conduit is provided with a branch section which overlies the open end of at least one additional filter tube when in the operative position, and said branch section includes a nozzle directed toward the interior of a filter tube for receiving fluid under pressure through said nipple and said conduit and injecting it into the interior of said additional filter tube.

45. A filter tube cleaning assembly according to claim 44 wherein said conduit branch section overlies a plurality of open ends of filter tubes when in the operative position and includes a plurality of nozzles each directed toward the interior of a filter tube.

46. A filter tube cleaning assembly according to claim 44 including;
   second means providing a guideway disposed substantially parallel to the interior passageway of said nipple, and wherein said conduit branch section includes a locking clip insertable in said guideway when said conduit is in the operative position; and
   second means for detachably securing said conduit in the operative position.

47. A filter tube cleaning assembly according to claim 42 wherein said means mounted on said tube sheet providing said guideway comprises a stanchion secured to said tube sheet, said guideway comprises a slot in said stanchion, said locking clip includes a tab with an opening therein, insertable through said slot when said conduit is inserted into said nipple, and said means for detachably securing said conduit in said operative position comprises a locking key having a portion insertable in said tab opening when said tab is inserted through said stanchion slot to prevent said tab from being removed from said slot.

48. A filter tube cleaning assembly according to claim 47 wherein said locking key includes a ring portion having a slot therein whereby said ring portion may be manipulated manually to receive said tab portion within said ring portion slot and align an end portion of said ring portion with said tab opening and be turned to pass the ring portion through the tab portion opening thereby locking the conduit in the operative in position.

49. A filter tube cleaning assembly according to claim 48 wherein said locking key includes a handle portion operable to gravity fall when said ring portion passes through said tab portion opening to misalign said ring portion slot with said tab portion opening to preclude said locking key from disconnecting from said tab portion.

50. A filter tube cleaning assembly according to claim 49 when said handle is radially disposed relative to said ring portion.

51. A filter-collector apparatus comprising:
   a closed vessel having an inlet for introducing pneumatically conveyed material thereinto and an outlet for discharging said material therefrom;
   said vessel having an offset section with a centerline disposed at an acute angle relative to a centerline of said vessel;

said offset section having a cross-sectional area sufficiently large to permit the ingress and egress of an attendant for cleaning the interior of said vessel;

said offset section having a removable access cover and a removable tube sheet spaced from said cover defining a plenum chamber;

means for detachably securing said tube sheet to said offset section;

at least one filter tube extending through an opening in said tube sheet and projecting through said offset section toward the interior of said vessel, having the interior thereof communicating with said plenum chamber, said filter tube having a support collar seated on said tube sheet;

means for detachably securing said filter tube to said tube sheet;

means disposed in said plenum chamber for selectively directing a stream of fluid under pressure into said filter tube for dislodging filtered material deposited on said filter tubes;

means for detachably securing said fluid directing means to said tube sheet; and said offset section having outlet means communicating with said plenum chamber.

52. A filter-collector apparatus according to claim 51 wherein said means for detachably securing said tube sheet to said offset section comprises wedging means.

53. A filter-collector apparatus according to claim 51 wherein said means for detachably securing said filter tube to said tube sheet comprises wedging means.

54. A filter-collector apparatus according to claim 52 wherein said means disposed in said plenum chamber for selectively directing a stream of fluid under pressure into said filter tube for dislodging filtered material deposited on said filter tube comprises a conduit removably insertable in an operative position in an internal passageway of a nipple mounted on said vessel and communicable with a source of fluid under pressure, having a nozzle directed toward the interior of said filter tube for receiving fluid under pressure through said nipple and conduit and injecting it into the interior of said filter tube, and wherein said means for detachably securing said fluid directing means to said tube sheet comprises means mounted on said tube sheet providing a guideway disposed substantially parallel to the internal passageway of said nipple and a locking clip disposed on said conduit and insertable in said guideway when said conduit is in said operable position.

* * * * *

UNITED STATES PATENT AND TRADEMARK OFFICE
CERTIFICATE OF CORRECTION

PATENT NO. : 5,298,159
DATED : March 29, 1994
INVENTOR(S) : William R. Peterman

It is certified that error appears in the above-identified patent and that said Letters Patent is hereby corrected as shown below:

In claim 42, col. 14, line 4, before "position" insert
--means for detachably securing said conduit in said operative--

Signed and Sealed this

Twenty-sixth Day of July, 1994

Attest:

BRUCE LEHMAN

Attesting Officer    Commissioner of Patents and Trademarks